FIG. 3.

April 26, 1966 C. C. GARDNER 3,248,151
CHIP DUMP TRAILER
Filed May 18, 1964 7 Sheets-Sheet 4

INVENTOR.
CLIFFORD C. GARDNER
BY

ATTORNEYS

April 26, 1966

C. C. GARDNER 3,248,151

CHIP DUMP TRAILER

Filed May 18, 1964

INVENTOR.
CLIFFORD C. GARDNER
BY
Van Valkenburgh and Fields
ATTORNEYS

April 26, 1966   C. C. GARDNER   3,248,151
CHIP DUMP TRAILER
Filed May 18, 1964   7 Sheets-Sheet 6

INVENTOR.
CLIFFORD C. GARDNER
BY
Van Valkenburgh and Fields
ATTORNEYS

April 26, 1966     C. C. GARDNER     3,248,151

CHIP DUMP TRAILER

Filed May 18, 1964     7 Sheets-Sheet 7

INVENTOR.
CLIFFORD C. GARDNER
BY
*Van Valkenburgh and Fields*
ATTORNEYS

United States Patent Office 3,248,151
Patented Apr. 26, 1966

3,248,151
CHIP DUMP TRAILER
Clifford C. Gardner, Albuquerque, N. Mex., assignor to Timpte Division of the Ohio Brass Company, Denver, Colo., a corporation of New Jersey
Filed May 18, 1964, Ser. No. 367,940
18 Claims. (Cl. 298—35)

This invention relates to a dump trailer, and more particularly to a dump trailer for hauling and dumping wood chips and the like.

Various types of trailers, both for rail and over the road use, have been provided for hauling wood chips from the sawmill to the wood pulp mill, where the wood chips are converted to paper and paper products. However, each of the previous chip dump trailers have had various inherent disadvantages. One disadvantage is that the chips tend to stick to each other and, upon opening the doors at the bottom of the trailer, all of the chips are not discharged, but rather cling to each other and to the sides of the trailer and any cross supporting members within the trailer. Thus, it has been deemed necessary to provide auxiliary vibrators for vibrating the trailer to dislodge the chips, or to hire personnel who use long poles for dislodging the material when the doors are opened. Also, many trailers, due to inwardly sloping ends, have a reduced cross sectional area at the lower end, which causes the wood chips to jam together in the bottom of the trailer, rather than dropping through the bottom when the doors are open.

Among the objects of the present invention are to provide a novel dump trailer; to provide such a trailer particularly adapted to haul wood chips and the like; to provide such a trailer having a substantially uniform internal cross section; to provide such a trailer in which very few of the chips tend to stick thereto; to provide such a trailer having novel pneumatically operated doors; to provide such a trailer wherein the mechanism for opening the doors initiate and enhance discharge movement of the material in the trailer upon opening of the doors; to provide such a trailer having doors which increase the discharge area without increasing the vertical clearance for the doors beneath the trailer; to provide such a trailer in which the doors are provided with anti-backlash means to prevent slack in the operating mechanism when the doors are opened; to provide such a trailer wherein the doors are provided with means for taking up slack in the operating mechanism to prevent backlash; and to provide such a trailer which is simple in construction yet highly efficient in operation.

Additional objects and the novel features of this invention will become apparent from the description which follows, taken in conjunction with the accompanying drawings, in which.

Figure 1:
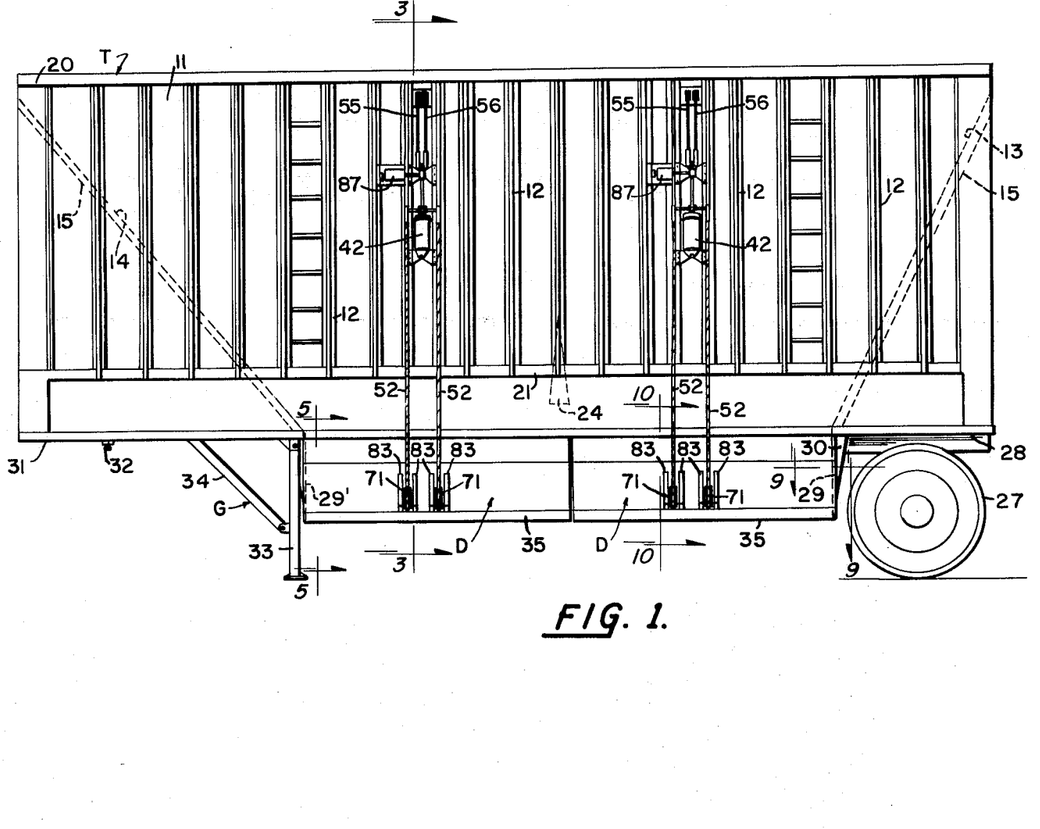
FIG. 1 is a side elevation of a chip dump trailer of this invention, showing certain interior parts in dotted lines.
Figure 2:
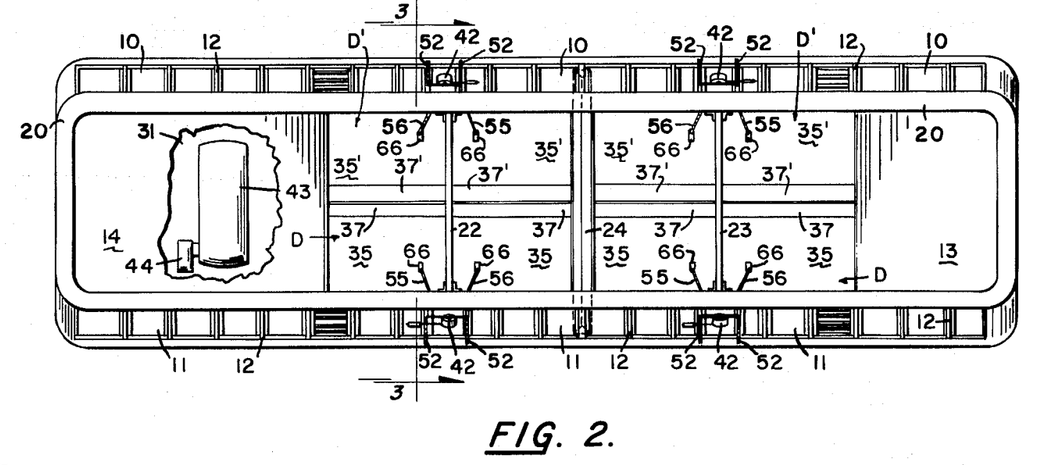
FIG. 2 is a top plan view of the trailer of FIG. 1, with a portion of a sloping end of the trailer floor broken away to show parts underneath the same.
Figure 3:
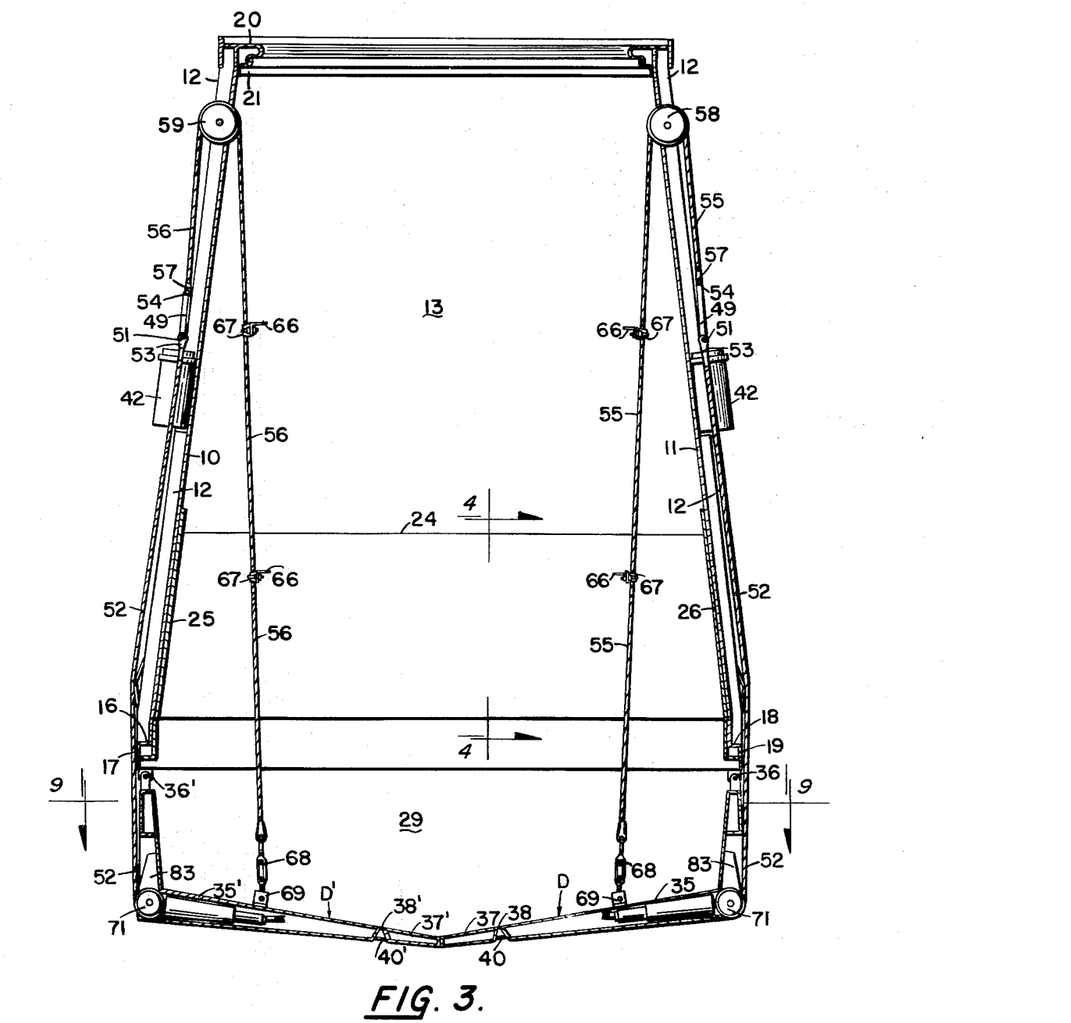
FIG. 3 is a vertical section, taken along line 3—3 of FIGS. 1 and 2, showing particularly the connection of cables to the doors and to hydraulic cylinders.

In accordance with this invention, a chip dump trailer T, as in FIGS. 1, 2 and 3, has side walls 10 and 11, as best seen in FIG. 3, which are downwardly and outwardly inclined, as about 10° away from the vertical and each of which is provided on the outside with a plurality of vertically extending ribs 12 for reinforcement. The side walls are joined by a downwardly and inwardly sloping rear wall 13, such as inclined at about 65° to the horizontal, and a downwardly and inwardly sloping front wall 14, as in FIG. 1, such as inclined at about 50° to the horizontal. End walls 13 and 14 have upwardly extending ribs 15 on the underside, as indicated in FIG. 1, for added strength. The chips in the trailer are discharged through the bottom openings provided when four doors D and D' are opened downwardly, doors D being on one side and doors D' on the opposite side. Advantageously, the sides slope outwardly at an angle such as to compensate for the inward slope of the front and rear panels, so that the horizontal cross section throughout the vertical height of the trailer is uniform. Thus, when the doors are opened, the wood chips will not be wedged together, as in a trailer having a decreasing cross section toward the bottom, but will fall freely from the trailer.

Figure 4:
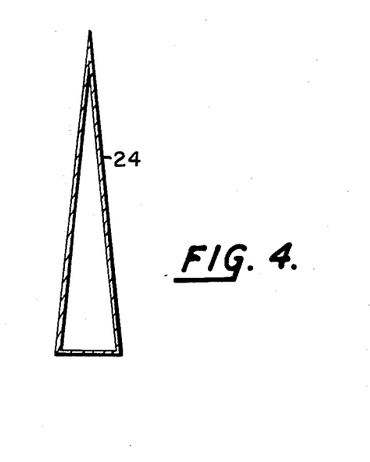
FIG. 4 is an enlarged, vertical section of a center beam, taken along line 4—4 of FIG. 3.

The lower end of side wall 10, as in FIG. 3, terminates in an outwardly extending flange 16 from which a flange 17 extends downwardly, for added strength, while the lower end of panel 11 similarly terminates in an outwardly extending flange 18 from which a flange 19 extends downwardly. The upper edge of the trailer is provided with a rib 20, having the cross sectional shape shown in FIG. 3 and extending entirely around the top of the trailer, as in FIG. 2, being reinforced by a Z-shaped angle 21 at the lower inside edge. To prevent the sides from spreading outwardly when the trailer is loaded, a pair of spaced beams 22 and 23 extend at spaced positions across the top of the trailer, as in FIG. 2, and an inverted triangular shaped beam 24 extends across the bottom of the trailer at the center thereof, as in FIGS. 1–4. As will be evident from FIG. 4, beam 24 is shaped so that the wood chips do not tend to adhere to it when doors D and D' are opened to discharge the material. Conveniently, beam 24 is attached to plates 25 and 26 which are welded to the inside of panels 10 and 11, as in FIG. 3.

The trailer is supported at the rear by wheels 27 located under rear plate 28, which is disposed rearwardly of a rear depending panel 29. Panel 29, beneath the lower edge of rear end panel 13, forms the rear end of a discharge space, the front end of which is provided by a panel 29', depending from the lower edge of front end panel 14. Panel 29 is strengthened by a plurality of spaced, vertical, triangular ribs 30, as in FIG. 9, while a front plate 31 is provided on the underside with a connection 32 for attachment to the fifth wheel of a tractor. When not attached to a tractor, the trailer may be supported at the front end by a landing gear G having a vertical leg 33 and a diagonal brace 34, the landing gear being moved upwardly when the trailer is attached to the tractor.

As in FIG. 3, the doors D each comprise a hollow, angular main panel 35 hinged to the bottom of the trailer by a pin 36 and a smaller hollow panel 37 hinged to the inner edge of panel 35 by means of a hinge 38, while doors D' each have an angular main panel 35' hinged to the bottom of the trailer by a pin 36' with a smaller panel 37' hinged thereto by means of a hinge 38'. As in FIG. 12, each half of hinge 38, with a hinge pin 39 extending through the interleaved ears thereof, may be welded to the adjacent edges of panels 35 and 37, while doors D' may be similarly constructed. To maintain panel 37 of door D in the same plane as main panel 35 when the door is closed, a stop plate 40 is attached at one edge to panel 37, as by welding, so that its opposite edge will abut the end of main panel 35, as shown, when the door is in closed position. A similar stop plate 40' may be provided on each door D', as in FIG. 3, so that the inner edges of the opposite doors will abut, as in FIG. 2, when the doors are closed.

Figure 5:
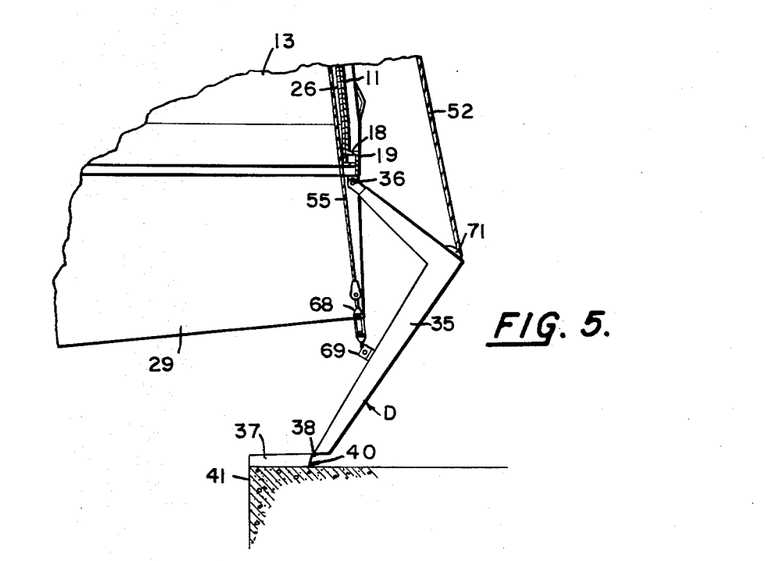
FIG. 5 is a fragmentary, enlarged vertical section, taken along line 5—5 of FIG. 1 but showing one of the doors in open position.

When the trailer is driven over a pit, such as pit 41 of FIG. 5, into which the material is to be discharged, the doors may be opened so that small panel 37 of door D rests on the top edge of the pit, while the main panel 35 is at an angle thereto, as shown. In this way, all of the material is discharged into the pit and the door does not extend into or over the pit, so as to prevent any of the wood chips from entering the pit. The other door D on the same side and the doors D' on the opposite side open in a similar manner.

Figure 6:
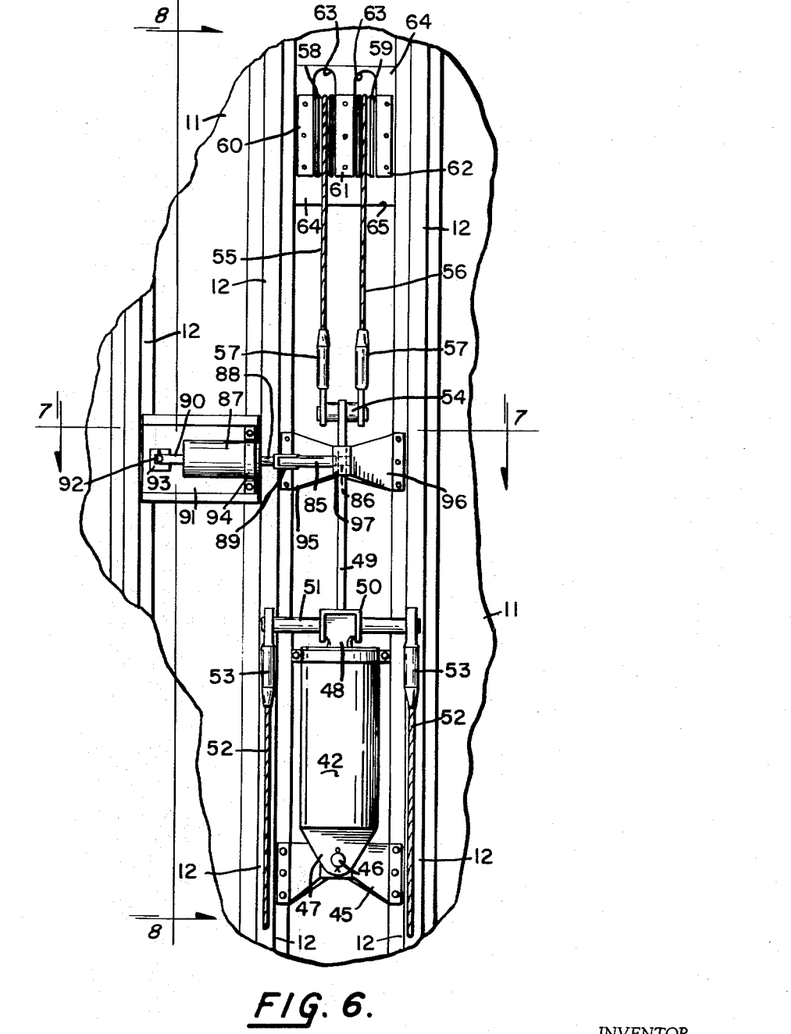
FIG. 6 is an enlarged, fragmentary, side elevation corresponding to a portion of FIG. 1 and showing details of a pneumatic cylinder, a cable attachment to the cylinder and a pneumatic lock arrangement.
Figures 7, 8, 9:
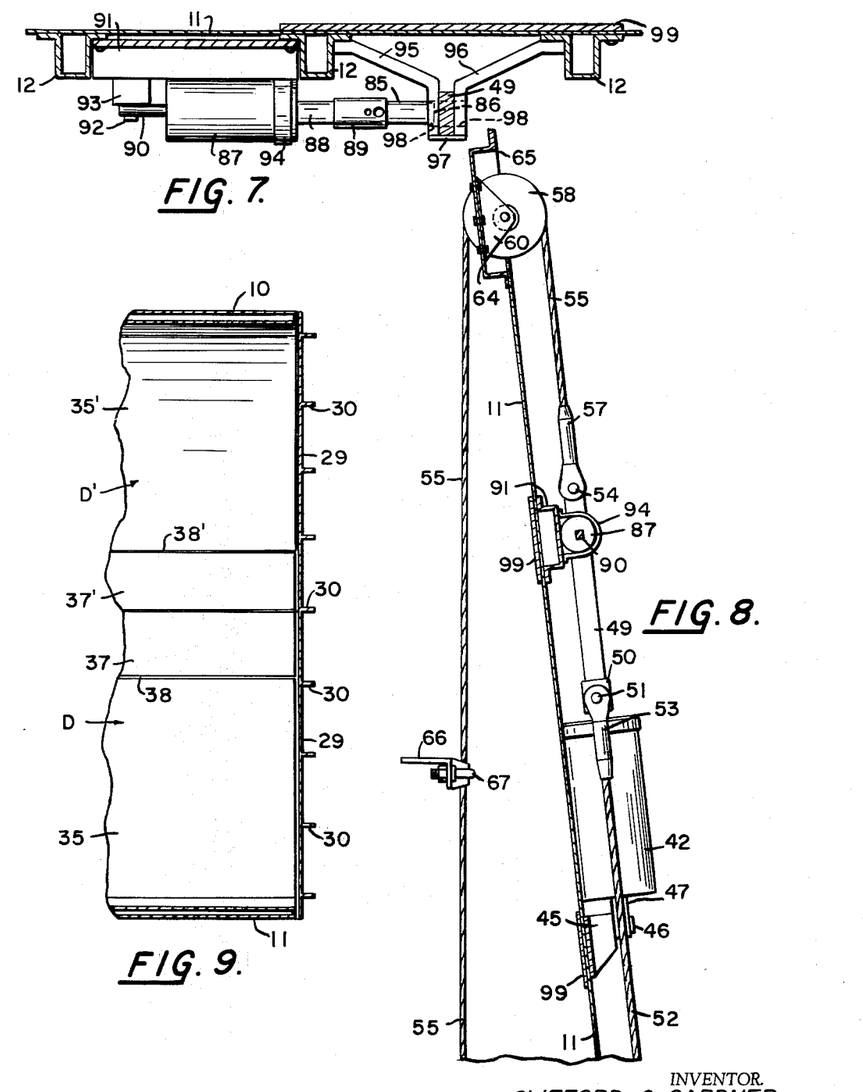
FIG. 7 is a further enlarged, horizontal section, taken along line 7—7 of FIG. 6, showing the pneumatic lock arrangement.
FIG. 8 is a vertical section, taken along line 8—8 of FIG. 6, showing further details of a cable and sheave arrangement.
FIG. 9 is a fragmentary, horizontal section, taken along line 9—9 of FIG. 1, showing an end panel construction adjacent the doors.

Conveniently, each door is operated by a pneumatic cylinder 42, as in FIG. 6, which is double acting and is supplied with compressed air through air hoses (not shown) extending from an air storage cylinder 43 mounted on front plate 31 under front wall 14, as in FIG. 2. The air supplied to the cylinders is controlled by a solenoid controlled valve 44, conveniently operated from the cab of the tractor. The lower end of each cylinder 42 is pivotally connected to a bracket 45, mounted between a pair of ribs 12, by means of a pivot pin 46 which extends through an ear 47 at the bottom of the cylinder. A piston rod 48 extends from the upper end of cylinder 42, while a bar 49, as in FIGS. 6 and 8, is provided at its lower end with a yoke 50 which conveniently extends over the end of the piston rod and is held in place by a transverse rod 51, the opposite ends of which are attached to the opposite ends of a cable 52 by connectors 53. A transverse pin 54 extends through the upper end of plate 49 for attachment of a pair of cables 55 and 56, as by connectors 57, while cables 55 and 56 extend upwardly over sheaves 58 and 59, respectively, which are pivotally mounted between brackets 60 and 61 brackets 61 and 62, respectively, as in FIG. 6, sheaves 58 and 59 extending through a pair of slots 63 in a box plate 64, on which, as in FIG. 8, brackets 60, 61 and 62 are mounted and which covers the inside of an opening 65 in side wall 11, box plate 64 being attached to the inside of side wall 11, as by welding. The cables 55 and 56 then extend downwardly through the body of the trailer to the respective door D or D'. Within the trailer body, each cable 55 and 56 is provided, as in FIGS. 3 and 8, with a pair of spaced, laterally extending fingers 66 attached thereto, as by means of U-bolt clamps 67. As will be evident, the fingers 66 start the material moving as the piston rod is extended and as the doors are opened, in a manner to be described. Thus, the material is urged downwardly through the doors, and once started, it will tend to continue to move out of the trailer. The lower end of each cable 55 and 56 is attached by means of an adjusting turnbuckle 68 to a bracket 69 on the main door panel 35 or 35'.

Figures 10, 12:
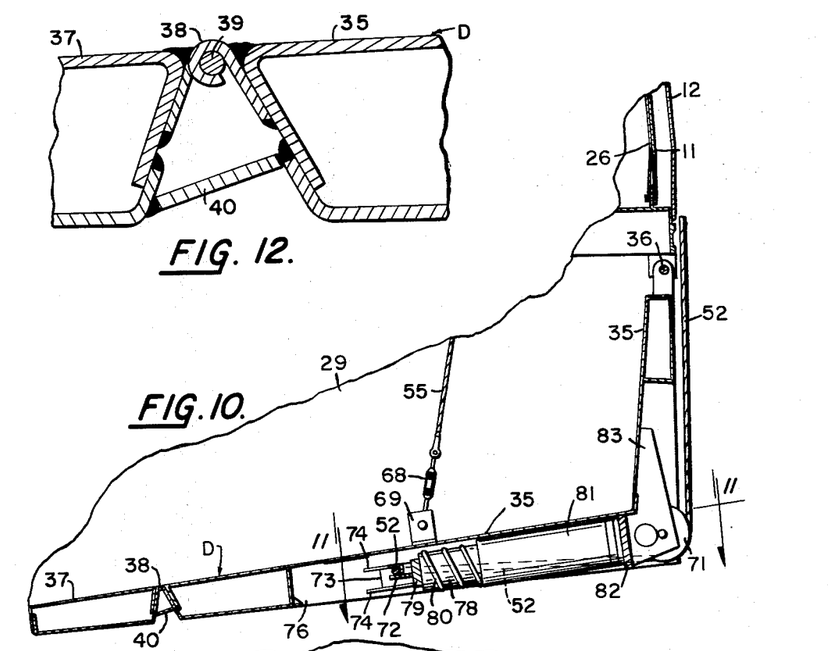
FIG. 10 is a fragmentary, enlarged, offset vertical section through a discharge door, taken along lines 10—10 of FIGS. 1 and 11, showing further details of the door and a takeup slide construction thereof.
FIG. 12 is a further enlarged, fragmentary section of a hinge joint between the door sections of FIG. 10.
Figure 11:
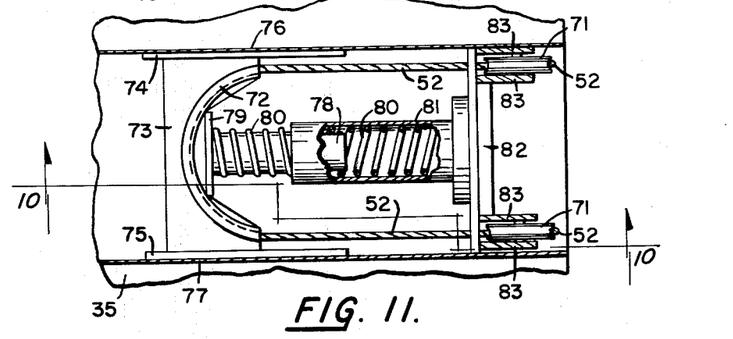
FIG. 11 is a further enlarged, substantially horizontal section, taken along line 11—11 of FIG. 10, showing the details of the takeup slide.

Each end of cable 52 extends downwardly from rod 51, as in FIGS. 1 and 3, and around a sheave 71, then, as in FIGS. 10 and 11, around a curved channel 72 of a take-up slide 73, which takes up the backlash in the cable 52 when the door is opened in a manner described below. The opposite edges of takeup slide 73 are movable between a pair of guides 74 and 75, respectively, mounted on the inside of each of a pair of spaced reinforcing ribs 76 and 77, extending between the top and bottom of the hollow main panel 35 of the door. Slide 73 is provided with a tubular central rod 78 which is attached to the inside of channel 72 by a foot 79 and is surrounded by a coil spring 80 which extends into a sleeve 81 attached to a rib 82 which extends transversely to and between ribs 76 and 77. Each pulley 71 is supported by and between a pair of reinforcing plates 83, conveniently having the contour shown in FIG. 10. Thus, as the takeup slide 74 is moved outwardly, spring 80 will be compressed in sleeve 81, tending to push the door outwardly to the open position of FIG. 5. During this movement, cables 55 and 56 will be slackened at bars 49 and will be moved downwardly within the trailer body by the doors as they open. When the piston rod 48 is retracted to close the doors, tension will be placed on cables 55 and 56, so that they pull the doors into closed position, while cable 52 will be slackened, but this slack will be taken up by takeup slide 73, due to the influence of compression spring 80 forcing the slide inwardly as the door is swung to closed position. By eliminating the backlash of cable 52 as the doors are swung to closed position, any tendency for cable 52 to slip off either pulley 71 is avoided. Thus, a more effective opening pull of cable 52 may be exerted at pulleys 71. In addition, spring 80 urges slide 73 against cable 52, to compensate for changes in the effective length of cable 52 as the door is opened.

When the doors are in closed position, cylinder 42 may be locked in place for travel, so that the air pressure may be taken off the cylinder. For this purpose, a locking pin 85, as in FIGS. 6 and 7, may extend into a hole 86 at an appropriate position in bar 49, as shown in dotted lines in FIGS. 6 and 7, through air pressure supplied to a cylinder 87 having a piston rod 88 to which the inner end of locking pin 85 is attached, as by a fork 89. Cylinder 87 may be double acting, i.e. supplied with air at the respective opposite end to extend and retract locking pin 85, or may be provided with a compression spring on the inside to force locking pin 85 into locking position whenever air pressure for retracting pin 85 is released. In order to utilize a type of cylinder which is normally pivoted at its end, as by an ear 90, but is mounted in fixed position, the cylinder may be mounted on a box shaped bracket 91, mounted between two ribs 12, with ear 90 connected to a stud 92 above a spacing block 93, with the front end of cylinder 86 held by a clamping strap 94. Bar 49 is guided by and slides between the spaced out turned flanges of a pair of angular brackets 95 and 96, as in FIG. 7, the spaced outer edges of the brackets being closed by a cap 97. Cap 97 is attached to the outer flanges and the inner flanges are attached to ribs 12 in any suitable manner, as by welding. The outer flanges of brackets 95 and 96 are provided with aligned transverse holes 98 for receiving locking pin 85, which may extend through hole 86 in bar 49 when hole 86 is aligned with holes 98. Side walls 10 and 11 may be reinforced at the positions of the brackets 45, 95 and 96, as by plates 99 welded to the inside of the wall, as in FIGS. 7 and 8. As will be evident, by extending piston rod 88 from cylinder 87, bar 49 can be locked by pin 85 between brackets 95 and 96, so that the air pressure may be released on cylinder 42, particularly during travel. When it is desired to unload the trailer, the double acting cylinder 87 may be operated so as to retract piston rod 88 to withdraw pin 85 from plate 49, so that piston rod 48 of cylinder 42 may be extended to open the trailer doors. It will be understood, of course, that when hydraulic fluid under pressure is readily available, hydraulic cylinders may be used instead of the pneumatic cylinders described above.

From the foregoing, it can be seen that the objects and requirements hereinbefore set forth have been fulfilled to a marked degree. Thus, a chip dump trailer has been provided which has a substantially uniform cross section from top to bottom in horizontal planes, in that the sides taper outwardly while the ends taper inwardly, thereby preventing jamming of the chips as the doors are opened. The doors are pneumatically operated by cables attached thereto and the cables which extend through the inside of the trailer have projections extending therefrom for dislodging the material, so that it begins flowing when the doors are opened. A spring-urged slide is provided within the door to prevent backlash of the cables when the doors are opened, by taking up the slack in the cables. Also, it can be seen that the chip dump trailer of this invention is of relatively simple construction yet is efficient in operation.

Although a preferred embodiment of this invention has been illustrated and described, it will be understood that other embodiments may exist and that various changes and variations may be made, all without departing from the spirit and scope of this invention.

What is claimed is:

1. A trailer for transporting and dumping wood chips and the like comprising:
    a trailer body having side walls joined to front and rear walls;
    doors hinged to said side walls adjacent the lower edges thereof for opening downwardly and adapted to close the bottom of said trailer body when moved upwardly;
    cable means attached to said doors;
    means attached to said side walls of said trailer body and interconnected with said cables for opening and closing said doors; and
    means mounted in said doors and operatively connected to said cables to take up slack therein when said doors are opened.

2. A trailer, as set forth in claim 1, wherein said slack takeup means is resilient.

3. A trailer, as set forth in claim 1, wherein said slack takeup means includes a spring-urged slide within said door and with which said cable is connected.

4. A trailer for transporting and dumping wood chips and the like comprising:
    a trailer body having side walls joined to front and rear walls;
    doors hinged to said side walls adjacent the lower edge thereof for opening downwardly and adapted to close the bottom of said body when moved upwardly;
    cables connected to said doors, at least one cable for a door extending downwardly to said door within said body;
    means connected to said cables for operating said cables for opening and closing said doors; and
    laterally extending means on said cable within said body for initiating movement of material in said body as said cable moves downwardly when said door is opened.

5. A trailer, as set forth in claim 4, wherein each said laterally extending means comprises:
    a finger adapted to extend laterally from said cable; and
    a clamp for attaching said finger to said cable.

6. A trailer, as set forth in claim 4, wherein said cable operating means is mounted on the outside of said walls; and
    sheaves are mounted in said side walls above said cable operating means and said inside cables extend around said sheaves, one end of each of said inside cables being connected to said operating means and the other end being connected to one of said doors.

7. A trailer, as set forth in claim 4, wherein said front and rear walls slope inwardly and downwardly and said side walls slope outwardly and downwardly to provide a substantially uniform cross sectional area in horizontal planes.

8. A trailer for transporting and dumping wood chips and the like comprising:
    a trailer body having side walls joined to front and rear walls;
    doors hinged to said side walls adjacent the lower edge thereof for opening downwardly and adapted to close the bottom of said body when moved upwardly;
    cables connected to said doors, at least one cable for a door extending downwardly to said door within said body and at least one cable for a door extending to said door on the outside of said body;
    means for operating said cables mounted on the outside of said side walls above said doors;
    sheaves mounted in said side walls above said operating means, each inside cable extending upwardly from said operating means, over a sheave and then downwardly inside said body; and
    said doors being angular with an upwardly extending portion pivotally connected at its upper edge to the corresponding side wall and a hollow inwardly extending portion having an inner edge adapted to extend to the opposite door when closed, said outside cable extending into said hollow inwardly extending portion.

9. A trailer, as set forth in claim 8, wherein said doors include a main outer panel and an inner smaller panel hinged to said outer panel and adapted to pivot with respect to said main panel so as to engage the side of a pit into which said wood chips and the like are dumped when the doors are open, so that said doors tend to clear the opening of said pit to allow said wood chips and the like to fall through.

10. A trailer, as set forth in claim 9, including a stop plate attached to one of said smaller panel and said main panel and adapted to engage the other of said smaller panel and said main panel when said doors are closed to maintain said smaller panel in the same plane as said main panel.

11. A trailer, as set forth in claim 8, wherein:
    said outside cable is connected at both ends to said operating means and the central portion thereof engages slack takeup means in said door.

12. A trailer, as set forth in claim 11, including guide means in said door; and wherein:
    said takeup means includes a slide engaged by said cable and mounted for movement along said guide; and
    a spring for urging said slide inwardly so as to maintain said outside cable in tension.

13. A trailer, as set forth in claim 12, wherein said slide includes a generally U-shaped channel around which said cable extends;
    a pin extends outwardly from said U-shaped channel;
    a sleeve is mounted in said door and into which said pin extends; and
    said spring is a coil spring surrounding said pin and extending into said sleeve.

14. A trailer, as set forth in claim 8, including a pair of sheaves mounted on said door adjacent the lower outer corner thereof and each engaged by said outside cable.

15. A trailer, as set forth in claim 8, including locking means for engaging said cable operating means with said doors in closed position to prevent opening of said doors.

16. A trailer, as set forth in claim 15, wherein:
    said cable operating means includes a pneumatic cylinder and piston rod connected to each of said inside and outside cables, said cable operating cylinders being mounted in generally upright position on the outside of said side walls; and said locking means includes a pneumatic cylinder and piston rod mounted transversely to said cable operating cylinder on the outside of said side wall.

17. A trailer, as set forth in claim 16, wherein:

said cable operating means includes a bar movable upwardly and downwardly by said piston rod, said outside cable being attached to said cable operating means at the lower end of said bar and a pair of inside cables being attached at the upper end thereof;

a guide for said bar is attached to the outside of said side wall; and said locking means includes a locking pin movable laterally through holes in said guide and into a hole in said bar.

18. A trailer for transporting and dumping wood chips and the like comprising:

a trailer body having side walls joined to front and rear walls;

doors hinged to said side walls above the lower edges thereof for opening downwardly and adapted to close the bottom of said trailer body when moved upwardly;

cable means attached to said doors, including cables extending outside said body and downwardly to said doors and cables extending within said body and downwardly to said doors;

means attached to said side walls of said trailer body and interconnected with said cables for opening and closing said doors; and means operatively connected to said outside cables to take up slack therein when said doors are opened.

References Cited by the Examiner

UNITED STATES PATENTS

| 1,534,297 | 4/1925 | Carey. | |
|---|---|---|---|
| 2,077,534 | 4/1937 | Sell | 298—29 |
| 2,760,816 | 8/1956 | Kling | 298—29 |

FOREIGN PATENTS 632,776 12/1961 Canada.

BENJAMIN HERSH, *Primary Examiner.*